United States Patent
Nakada

(10) Patent No.: US 12,086,977 B2
(45) Date of Patent: Sep. 10, 2024

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Yuichi Nakada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/467,615

(22) Filed: Sep. 14, 2023

(65) Prior Publication Data

US 2024/0005478 A1   Jan. 4, 2024

Related U.S. Application Data

(63) Continuation of application No. 17/211,353, filed on Mar. 24, 2021, now Pat. No. 11,790,522.

(30) Foreign Application Priority Data

Mar. 27, 2020   (JP) ................. 2020-058462

(51) Int. Cl.
G06T 7/00       (2017.01)
B41F 33/00      (2006.01)

(52) U.S. Cl.
CPC .......... *G06T 7/001* (2013.01); *B41F 33/0036* (2013.01); *G06T 2207/10008* (2013.01); *G06T 2207/30144* (2013.01)

(58) Field of Classification Search
CPC ........... G06T 7/001; G06T 2207/10008; G06T 2207/30144; G06T 2207/10004; G06T 2207/20012; G06T 7/136; B41F 33/0036
See application file for complete search history.

(56) References Cited

U.S. PATENT DOCUMENTS

2018/0268534 A1*  9/2018  Kaneko .................. G06T 7/001

\* cited by examiner

*Primary Examiner* — Christopher Wait
(74) *Attorney, Agent, or Firm* — Canon U.S.A., Inc. IP Division

(57) ABSTRACT

A detection sensitivity is set such that a detection sensitivity for a defect corresponding to a predetermined local pattern in a reference image, which is a reference printing result, is lower than for a region other than the predetermined local pattern in the reference image. Image data representing an image of an inspection target is acquired and the image of the inspection target is inspected based on the reference image and the set detection sensitivity.

17 Claims, 16 Drawing Sheets

|  | DETECTION SENSITIVITY | |
|---|---|---|
|  | POINT-LIKE DEFECT | LINE-LIKE DEFECT |
| REGION A | HIGH | HIGH |
| REGION B | MEDIUM | MEDIUM |

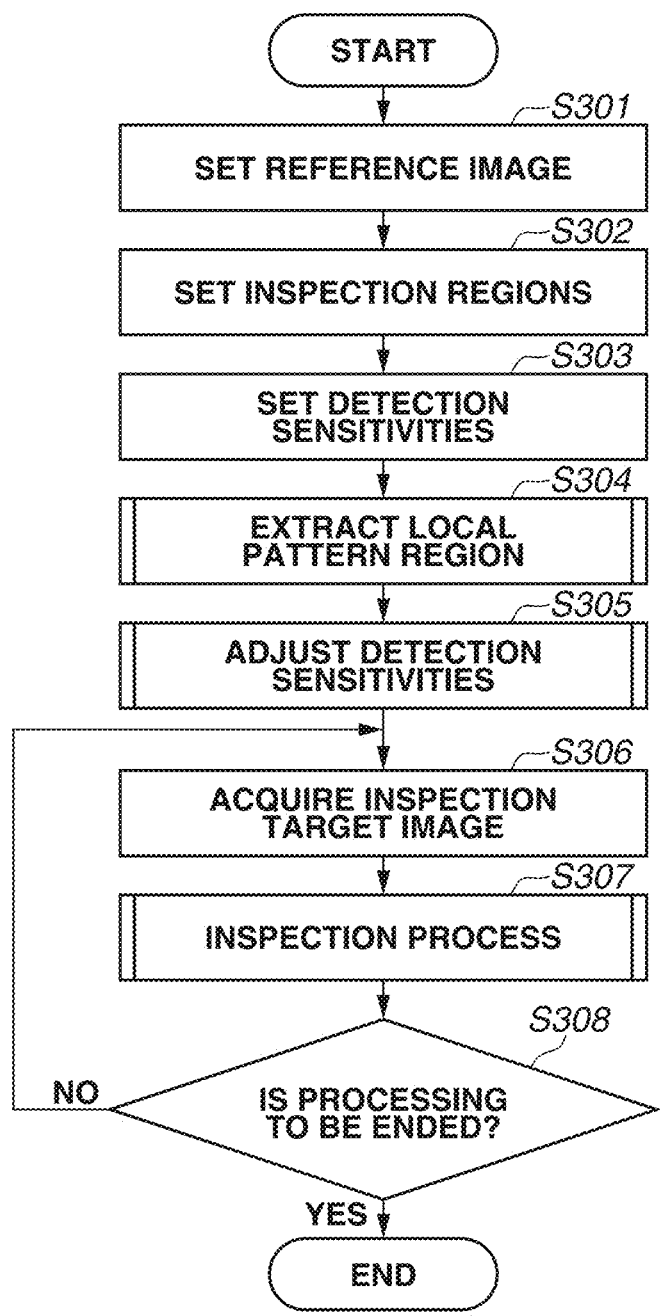

FIG.6

|  | DETECTION SENSITIVITY | |
|---|---|---|
|  | POINT-LIKE DEFECT | LINE-LIKE DEFECT |
| REGION A | HIGH | HIGH |
| REGION B | MEDIUM | MEDIUM |

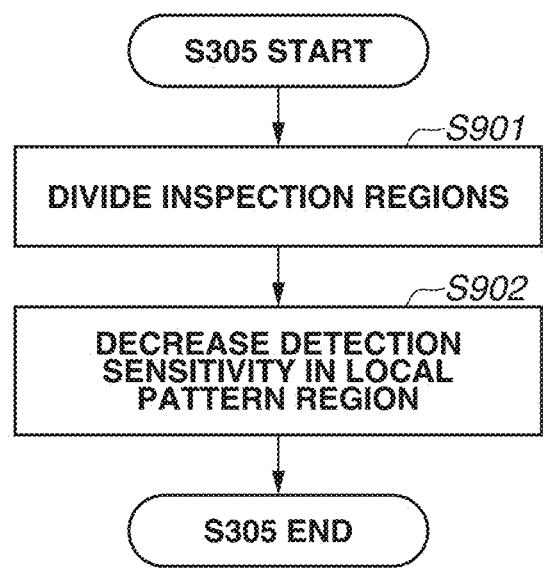

FIG.10A

|  | DETECTION SENSITIVITY ||
|---|---|---|
|  | POINT-LIKE DEFECT | LINE-LIKE DEFECT |
| REGION An | HIGH | HIGH |
| REGION Bn | MEDIUM | MEDIUM |
| REGION Ae | HIGH | MEDIUM |
| REGION Be | MEDIUM | LOW |

FIG.10B

|  | DETECTION SENSITIVITY ||
|---|---|---|
|  | POINT-LIKE DEFECT | LINE-LIKE DEFECT |
| REGION An | HIGH | HIGH |
| REGION Bn | MEDIUM | MEDIUM |
| REGION Ad | MEDIUM | HIGH |
| REGION Bd | LOW | MEDIUM |

FIG.16A

|  | DETECTION SENSITIVITY ||
|---|---|---|
|  | POINT-LIKE DEFECT | LINE-LIKE DEFECT |
| REGION An | HIGH | HIGH |
| REGION Bn | MEDIUM | MEDIUM |
| REGION Ad | MEDIUM | HIGH |
| REGION Bd | LOW | MEDIUM |
| REGION Ae | HIGH | MEDIUM |
| REGION Be | MEDIUM | LOW |

FIG.16B

|  | DETECTION SENSITIVITY ||
|---|---|---|
|  | POINT-LIKE DEFECT | LINE-LIKE DEFECT |
| REGION An | HIGH | HIGH |
| REGION Bn | MEDIUM | HIGH |
| REGION $Ae_H$ | HIGH | MEDIUM |
| REGION $Be_H$ | MEDIUM | MEDIUM |
| REGION $Ae_L$ | HIGH | LOW |
| REGION $Be_L$ | MEDIUM | LOW |

1

IMAGE PROCESSING APPARATUS, IMAGE PROCESSING METHOD, AND NON-TRANSITORY COMPUTER-READABLE STORAGE MEDIUM

This application is a Continuation of U.S. patent application Ser. No. 17/211,353, filed on Mar. 24, 2021, which claims priority from Japanese Patent Application No. 2020-058462 filed Mar. 27, 2020, which are both hereby incorporated by reference herein in their entireties.

BACKGROUND OF THE INVENTION

Field of the Invention

The present invention relates to an image processing technique for inspecting a print product.

Description of the Related Art

In a print product output from a printing apparatus, a color material such as ink or toner may be attached to an unintended portion and may cause stain. Or a sufficient color material may not be attached to a portion where an image should be formed, and color loss may occur, where the color is lighter than normal. Such a defect, such as stain or color loss, in the print product decreases the quality of the print product. Thus, the quality of the print product needs to be guaranteed by inspecting the presence or absence of a defect in the print product. A visual inspection for visually inspecting the presence or absence of a defect in the print product requires a significant cost. Thus, an inspection system that performs an automatic inspection is developed. In such an inspection system, it is possible to determine the presence or absence of a defect based on the difference between a reference image registered in advance and serving as an inspection standard for a print product and an inspection target image obtained by scanning a print product and serving as an inspection target. Japanese Patent Laid-Open No. 2018-155736 discusses a technique for correcting an inspection threshold to relax the inspection threshold in a region near an edge extracted from a reference image and inspecting a print product based on the difference between the reference image and an inspection target image and the corrected inspection threshold.

In the technique discussed in the publication of Japanese Patent Laid-Open No. 2018-155736, however, a defect present in the vicinity of a region including a feature such as an edge was undetectable in the inspection target image.

SUMMARY OF THE INVENTION

The present disclosure is directed to providing a process for improving the accuracy of inspection of the vicinity of a region including a feature in an inspection target image.

According to the first aspect of the present invention, there is provided an image processing apparatus comprising: a first setting unit configured to set a detection sensitivity such that the detection sensitivity for a defect corresponding to a predetermined local pattern in a reference image, which is a reference printing result, is lower than for a region other than the predetermined local pattern in the reference image; an acquisition unit configured to acquire image data representing an image of an inspection target; and a processing unit configured to inspect the image of the inspection target based on the reference image and the set detection sensitivity.

According to the second aspect of the present invention, there is provided an image processing method comprising: setting a detection sensitivity such that the detection sensitivity for a defect corresponding to a predetermined local pattern in a reference image, which is a reference printing result, is lower than for a region other than the predetermined local pattern in the reference image; acquiring image data representing an image of an inspection target; and inspecting the image of the inspection target based on the reference image and the set detection sensitivity.

According to the third aspect of the present invention, there is provided a non-transitory computer-readable storage medium storing instructions that, when executed by a computer, cause the computer to perform a method comprising: setting a detection sensitivity such that the detection sensitivity for a defect corresponding to a predetermined local pattern in a reference image, which is a reference printing result, is lower than for a region other than the predetermined local pattern in the reference image; acquiring image data representing an image of an inspection target; and inspecting the image of the inspection target based on the reference image and the set detection sensitivity.

Further features of the present invention will become apparent from the following description of exemplary embodiments with reference to the attached drawings.

BRIEF DESCRIPTION OF THE DRAWINGS

FIG. 3 is a flowchart illustrating processing executed by the image processing apparatus.

FIG. 6 is a diagram illustrating examples of detection sensitivities.

FIG. 9 is a flowchart illustrating a process of adjusting the detection sensitivities.

FIGS. 10A and 10B are diagrams illustrating examples of the adjusted detection sensitivities.

FIGS. 16A and 16B are diagrams illustrating examples of the adjusted detection sensitivities.

DESCRIPTION OF THE EMBODIMENTS

The present exemplary embodiments will be described below with reference to the drawings. The following exemplary embodiments do not necessarily limit the present invention. Not all the combinations of the features described in the present exemplary embodiments are essential for a method for solving the issues in the present invention. Each of the embodiments of the present invention described below can be implemented solely or as a combination of a plurality of the embodiments or features thereof where necessary or where the combination of elements or features from individual embodiments in a single embodiment is beneficial.

First Exemplary Embodiment

In a first exemplary embodiment, a region corresponding to a local pattern is extracted from a reference image, and an inspection process is performed by lowering a detection sensitivity for a defect similar to the local pattern. The inspection according to the present exemplary embodiment is performed based on the absolute value of the difference between an image (a reference image) representing a targeted printing result and an image (an inspection target image) which is an inspection target.

<Configuration of Printing System>

Figure 1:
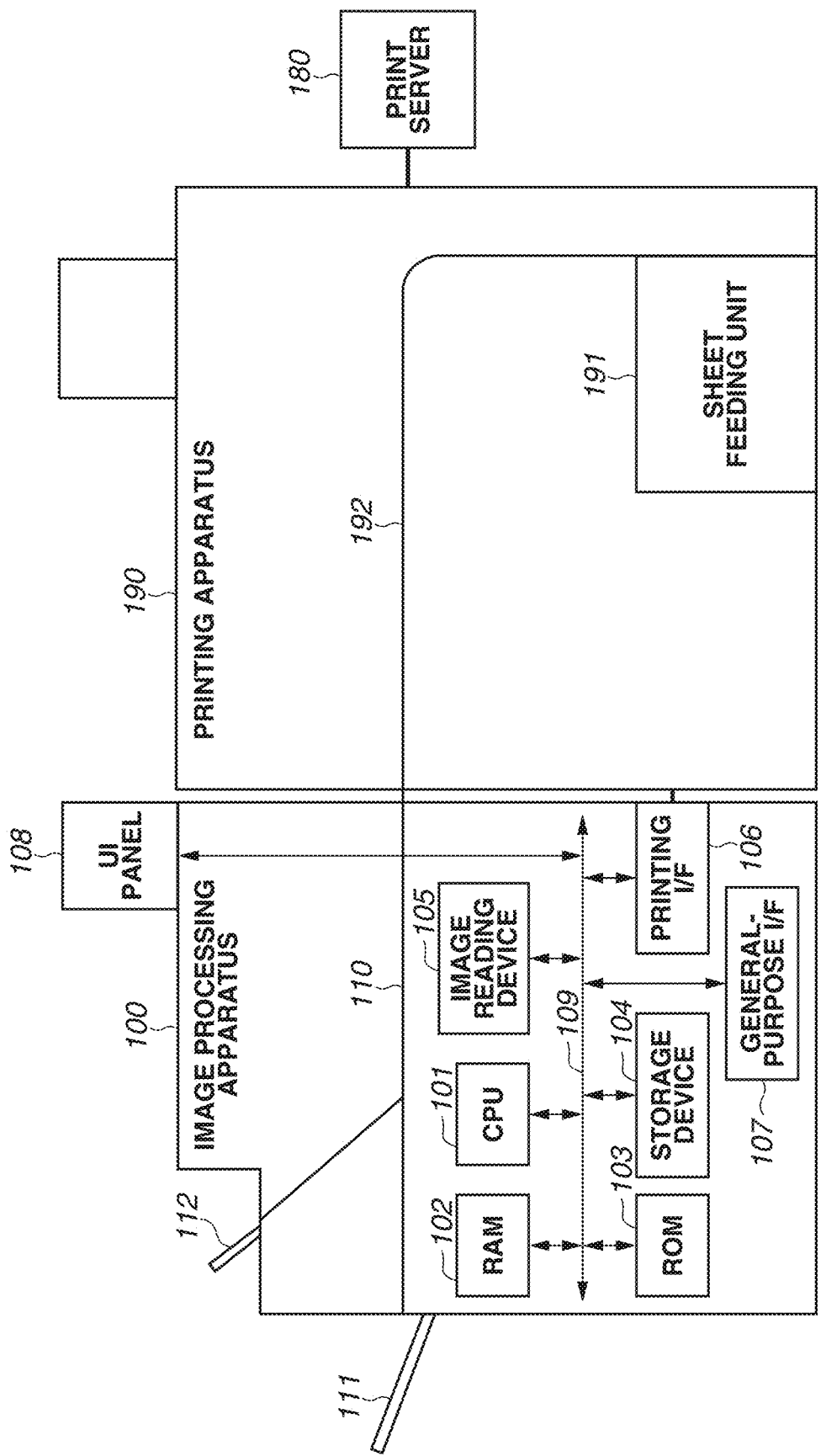
FIG. 1 is a diagram illustrating a configuration of a printing system including an image processing apparatus.

FIG. 1 is a diagram illustrating an example of the configuration of an entire printing system including an image processing apparatus 100 and that outputs and inspects a print product. The printing system according to the present exemplary embodiment includes the image processing apparatus 100, a print server 180, and a printing apparatus 190. The print server 180 generates a print job of a document to be printed and inputs the print job to the printing apparatus 190. The printing apparatus 190 forms an image on a recording medium (a print sheet) based on the print job input from the print server 180. The printing apparatus 190 includes a sheet feeding unit 191, and a user sets the print sheet in advance in the sheet feeding unit 191. When the print job is input, the printing apparatus 190 conveys the print sheet set in the sheet feeding unit 191 along a conveying path 192 while forming an image on the surface (one side or both sides) of the print sheet and sends the print sheet to the image processing apparatus 100. The printing apparatus 190 according to the present exemplary embodiment is a printing apparatus using an electrophotographic method, but may be a printing apparatus using an offset printing method or an inkjet method.

The image processing apparatus 100 inspects a defect on a print product as an inspection target on which printing is performed. The print product as the inspection target, which is obtained by the printing apparatus 190 forming the image on the print sheet, is conveyed along the conveying path 192 and inspected by the image processing apparatus 100. The image processing apparatus 100 functions as an inspection processing apparatus. The image processing apparatus 100 includes a central processing unit (CPU) 101, a random-access memory (RAM) 102, and a read-only memory (ROM) 103. The image processing apparatus 100 also includes a storage device 104, an image reading device 105, a printing interface (I/F) 106, a general-purpose I/F 107, a user interface (UI) panel 108, and a main bus 109. Further, the image processing apparatus 100 includes a conveying path 110 for the print product and connected to the conveying path 192 of the printing apparatus 190, an output tray 111 for a final print product having passed the inspection, and an output tray 112 for a print product having failed the inspection because of a defect found. A configuration may be employed in which the print product is not classified into only two types, namely pass and fail, but is classified into finer categories. In the printing system, the storage device 104, the image reading device 105, the UI panel 108, the conveying path 110, the output tray 111, and the output tray 112 may be provided outside the image processing apparatus 100.

The CPU 101 is a processor that performs overall control of the components of the image processing apparatus 100. The RAM 102 functions as a main memory and a work area for the CPU 101. The ROM 103 stores a group of programs to be executed by the CPU 101. The storage device 104 stores an application to be executed by the CPU 101 and data to be used in image processing. The image reading device 105 is a scanner. The image reading device 105 reads one side or both sides of the print product sent from the printing apparatus 190 on the conveying path 110 and acquires image data.

The printing I/F 106 is an interface connected to the printing apparatus 190 and is for synchronizing the processing timings of the print product between the image processing apparatus 100 and the printing apparatus 190 and notifying the image processing apparatus 100 and the printing apparatus 190 of the operation states of each other. The general-purpose I/F 107 is a serial bus interface such as a Universal Serial Bus (USB) interface and an Institute of Electrical and Electronics Engineers (IEEE) 1394 interface and enables the user to carry data of a log. The UI panel 108 is a display device such as a liquid crystal display and functions as a user interface for notifying the user of the current state and settings of the image processing apparatus 100. The UI panel 108 can include an input device such as a touch panel or a button and may receive an instruction from the user regarding the inspection. The input device may be provided separately from the UI panel 108, as in a mouse or a keyboard. The main bus 109 is a transmission path to which the modules of the image processing apparatus 100 are connected.

The image processing apparatus 100 conveys the print product sent from the printing apparatus 190 on the conveying path 110 while, based on the image data of the print product read by the image reading device 105, performing an inspection process described below. If the print product passes the inspection, the print product is conveyed to the output tray 111 for pass. If the print product fails the inspection, the print product is conveyed to the output tray 112 for fail. Consequently, only print products confirmed as satisfying a quality standard can be collected in the output tray 111 as print products to be delivered.

<Functional Configuration of Image Processing Apparatus>

Figure 2:
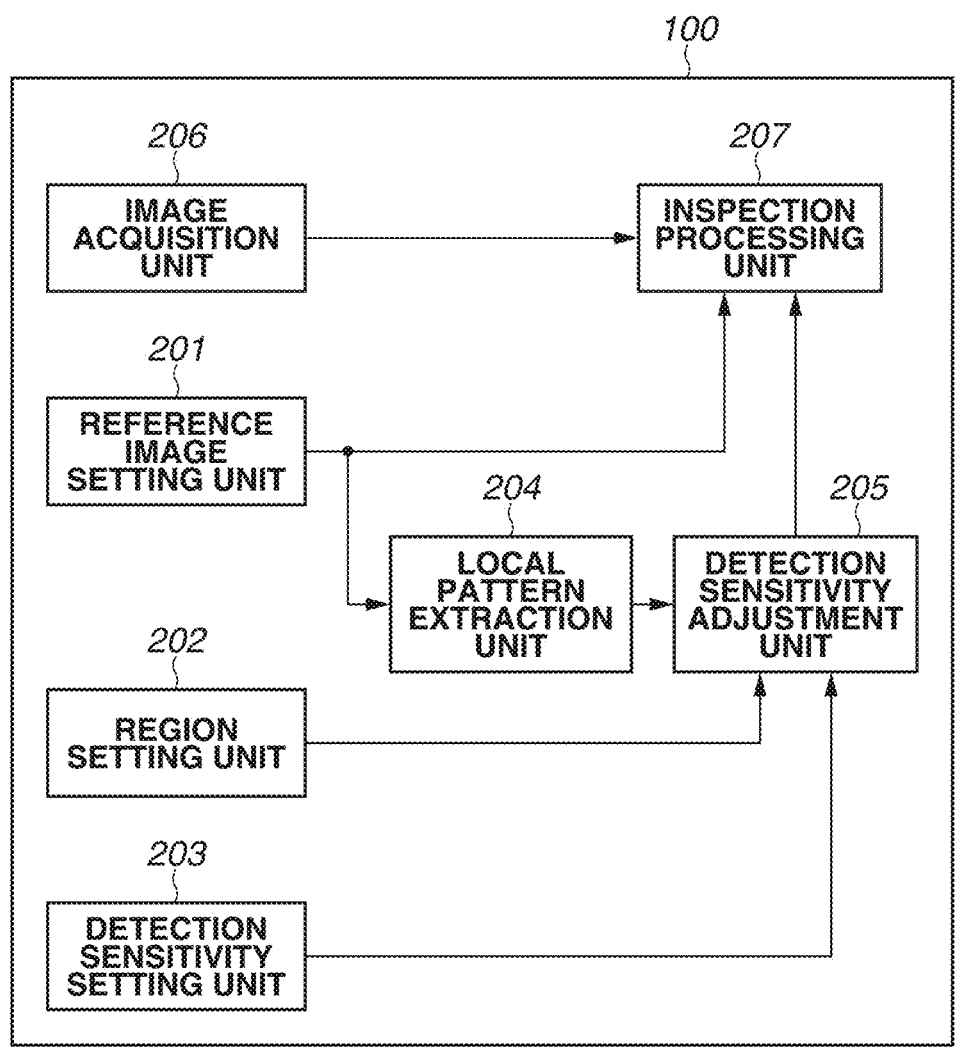
FIG. 2 is a block diagram illustrating a functional configuration of the image processing apparatus.

FIG. 2 illustrates the functional configuration of the image processing apparatus 100. The image processing apparatus 100 includes a reference image setting unit 201, a region setting unit 202, a detection sensitivity setting unit 203, a local pattern extraction unit 204, a detection sensitivity adjustment unit 205, an image acquisition unit 206, and an inspection processing unit 207.

The reference image setting unit 201 sets an image represented by image data recorded in the RAM 102 or the storage device 104 as a reference image. Based on an instruction from the user acquired via the UI panel 108, the region setting unit 202 sets inspection regions in the reference image. Based on an instruction from the user acquired via the UI panel 108, the detection sensitivity setting unit 203 sets detection sensitivities for defects in each of the inspection regions. The detection sensitivities according to the present exemplary embodiment are set for the respective types of defects. The types of defects according to the present exemplary embodiment are two types, namely a point-like defect and a line-like defect. The local pattern extraction unit 204 extracts a region corresponding to a particular local pattern from the reference image. The local pattern which is the extraction target according to the present exemplary embodiment is a line-like pattern, and the local pattern extraction unit 204 extracts a region corresponding to a line-like pattern from the reference image. The detection sensitivity adjustment unit 205 lowers the detection sensitivity for a defect similar to the local pattern in a region corresponding to the local pattern. The detection sensitivity adjustment unit 205 according to the present exemplary embodiment lowers the detection sensitivity for a line-like defect in the region corresponding to the line-like pattern. The image acquisition unit 206 acquires inspection target image data representing an inspection target image and obtained by the image reading device 105 reading a print product on the conveying path 110. The acquired inspection target image data is held in the RAM 102 or the storage device 104. The inspection processing unit 207 performs an inspection process on the inspection target image based on the difference between the reference image and the inspection target image and the detection sensitivities, and outputs the inspection result.

<Processing Executed by Image Processing Apparatus>

Figure 4A:
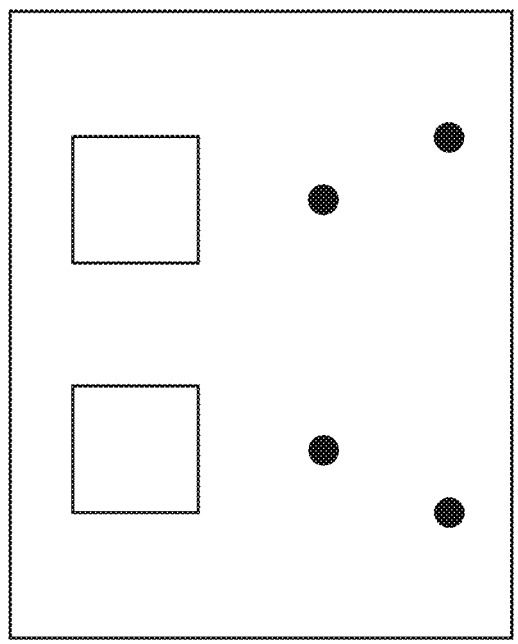
FIGS. 4A and 4B are diagrams illustrating examples of a reference image and an inspection target image.

FIG. 3 is a flowchart illustrating processing executed by the image processing apparatus 100. In step S301, the reference image setting unit 201 sets a reference image. FIG. 4A illustrates an example of the reference image. Reference image data representing the reference image is created in advance based on a scanned image obtained by reading a print product output from the printing apparatus 190 and is recorded in the RAM 102 or the storage device 104.

Figure 5:
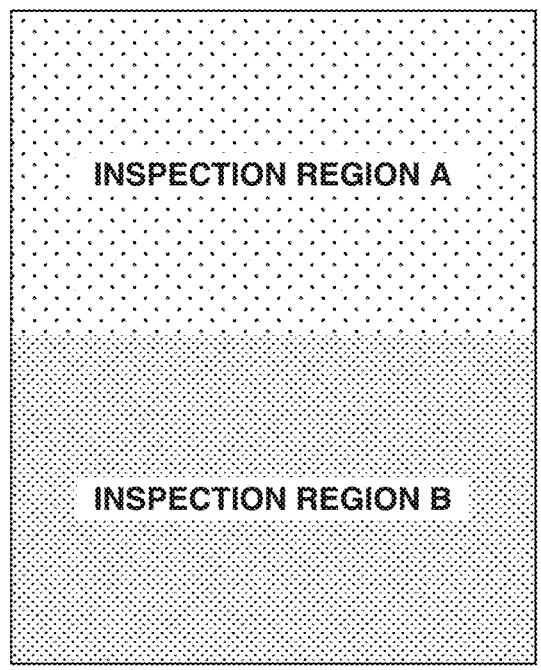
FIG. 5 is a diagram illustrating examples of inspection regions.

In step S302, the region setting unit 202 sets inspection regions in the reference image based on an instruction from the user acquired through the UI panel 108. FIG. 5 illustrates an example of the inspection regions. The region setting unit 202 according to the present exemplary embodiment sets inspection regions A and B in the reference image. In step S303, the detection sensitivity setting unit 203 sets detection sensitivities for defects in each of the inspection regions based on an instruction from the user acquired via the UI panel 108. The detection sensitivity setting unit 203 according to the present exemplary embodiment sets detection sensitivities for a point-like defect and a line-like defect in each of the inspection regions at three levels, namely high, medium, and low. The higher the detection sensitivity is, the lower the contrast between a defect and the background is, or the smaller the size of a defect is. FIG. 6 illustrates examples of the detection sensitivities. In the inspection region A, the detection sensitivities for a point-like defect and a line-like defect are set to high. In the inspection region B, the detection sensitivities for a point-like defect and a line-like defect are set to medium.

Figure 7:
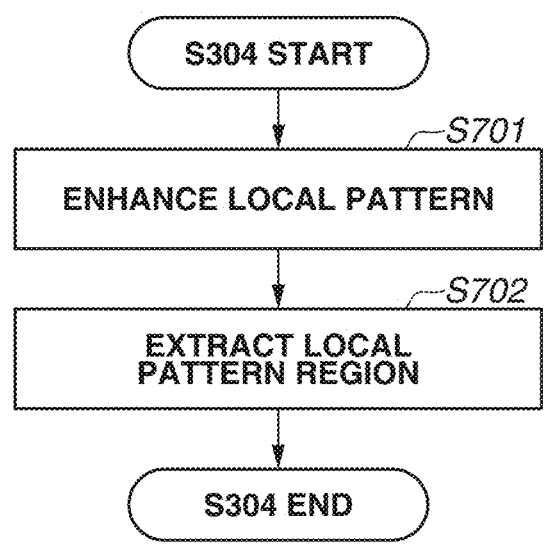
FIG. 7 is a flowchart illustrating a process of extracting a local pattern region.
Figure 8A:
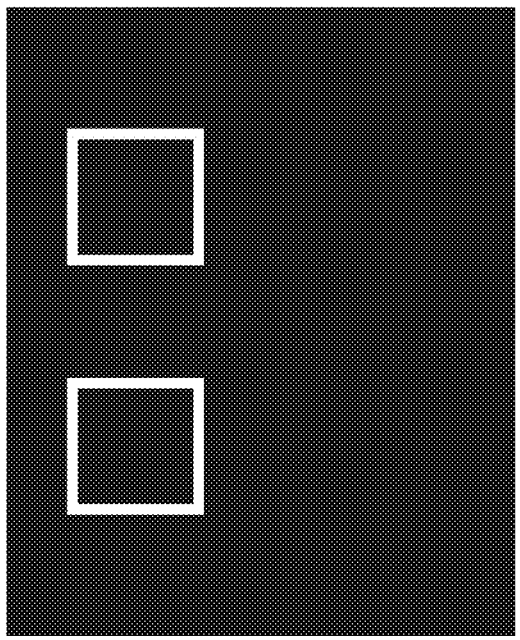
FIGS. 8A, 8B, 8C, and 8D are diagrams illustrating examples of local pattern regions.

In step S304, the local pattern extraction unit 204 extracts a region corresponding to a local pattern in the reference image. FIG. 7 is a flowchart illustrating the process of extracting the region corresponding to the local pattern. The details of the process of extracting the region corresponding to the local pattern are described below. In step S701, the local pattern extraction unit 204 applies a line enhancement filter to the reference image, thereby enhancing a line-like pattern included in the reference image. As a result of using the line enhancement filter, the more the pixel corresponds to the line-like pattern, the greater the pixel value of the pixel is. Hereinafter, an image obtained by applying the line enhancement filter to the reference image will be referred to as a "line-enhanced image". The line enhancement filter according to the present exemplary embodiment is a known Sobel filter. Alternatively, a known two-dimensional filter such as a Prewitt filter may be used. In step S702, the local pattern extraction unit 204 extracts a region corresponding to the line-like pattern in the line-enhanced image. In the present exemplary embodiment, an edge region is extracted as the region corresponding to the line-like pattern. FIG. 8A illustrates an example of the edge region. Specifically, the local pattern extraction unit 204 performs a threshold process on pixels in the line-enhanced image and extracts a pixel having a pixel value greater than a threshold, as an edge pixel included in the edge region. A known morphological process may be applied to the extracted edge region, thereby correcting the edge region.

Figure 8B:
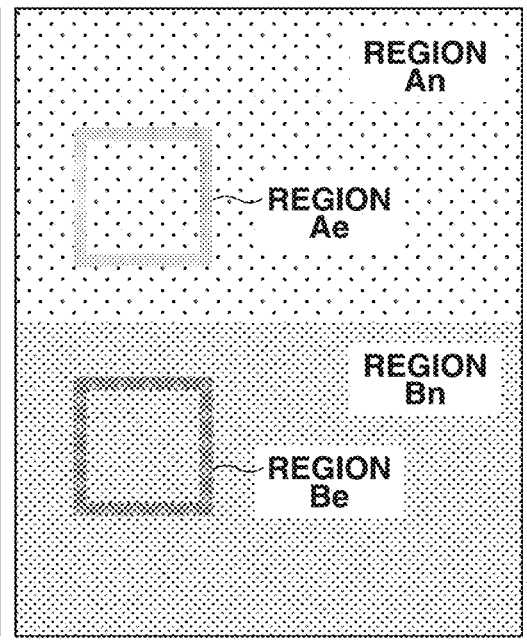

In step S305, the detection sensitivity adjustment unit 205 lowers the detection sensitivity for a defect similar to the local pattern in the region corresponding to the local pattern. FIG. 9 is a flowchart illustrating the process of adjusting the detection sensitivities. The details of the process of adjusting the detection sensitivities are described below. In step S901, the detection sensitivity adjustment unit 205 divides each of the inspection regions based on the edge region. FIG. 8B illustrates examples of the divided inspection regions. In the present exemplary embodiment, the detection sensitivity adjustment unit 205 sets an edge region in the inspection region A as a region Ae and sets a non-edge region in the inspection region A as a region An. The detection sensitivity adjustment unit 205 sets an edge region in the inspection region B as a region Be and sets a non-edge region in the inspection region B as a region Bn. In step S902, the detection sensitivity adjustment unit 205 lowers the detection sensitivity for a line-like defect as a defect similar to the line-like pattern in the edge region. Specifically, in the region Ae, the detection sensitivity adjustment unit 205 sets the detection sensitivity for a line-like defect to be lower than the detection sensitivity set for the inspection region A and sets the detection sensitivity for a point-like defect to be the same as the detection sensitivity set for the inspection region A. In the region Be, the detection sensitivity adjustment unit 205 sets the detection sensitivity for a line-like defect to be lower than the detection sensitivity set for the inspection region B and sets the detection sensitivity for a point-like defect to be the same as the detection sensitivity set for the inspection region B. A detection sensitivity for the region An is set to be the same as the detection sensitivity set for the inspection region A, and a detection sensitivity for the region Bn is set to be the same as the detection sensitivity set for the inspection region B. FIG. 10A illustrates examples of the adjusted detection sensitivities.

Figure 4B:
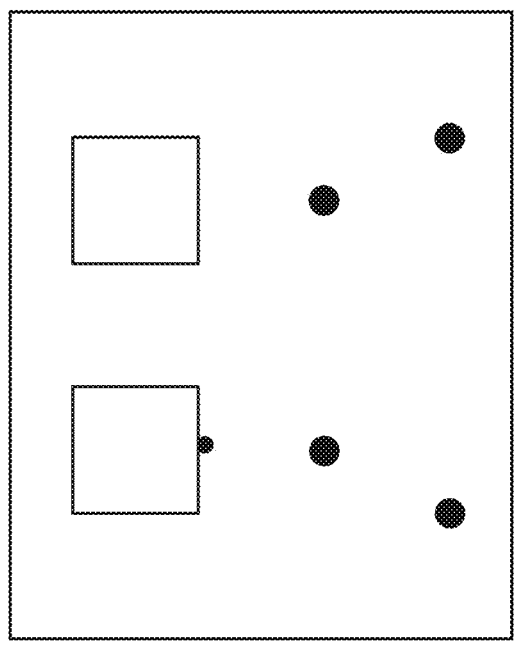

In step S306, the image acquisition unit 206 acquires inspection target image data representing an inspection target image. FIG. 4B illustrates an example of the inspection target image. In step S307, the inspection processing unit 207 performs an inspection process on the inspection target image based on the difference between the reference image and the inspection target image and the detection sensitivities, and outputs the inspection result. The details of the inspection process will be described below. In step S308, the inspection processing unit 207 determines whether the processing is to be ended based on print information from the printing apparatus 190 or an instruction from the user acquired through the UI panel 108. If it is determined that the processing is not to be ended (NO in step S308), the processing returns to step S306.

<Inspection Process>

Figure 11:
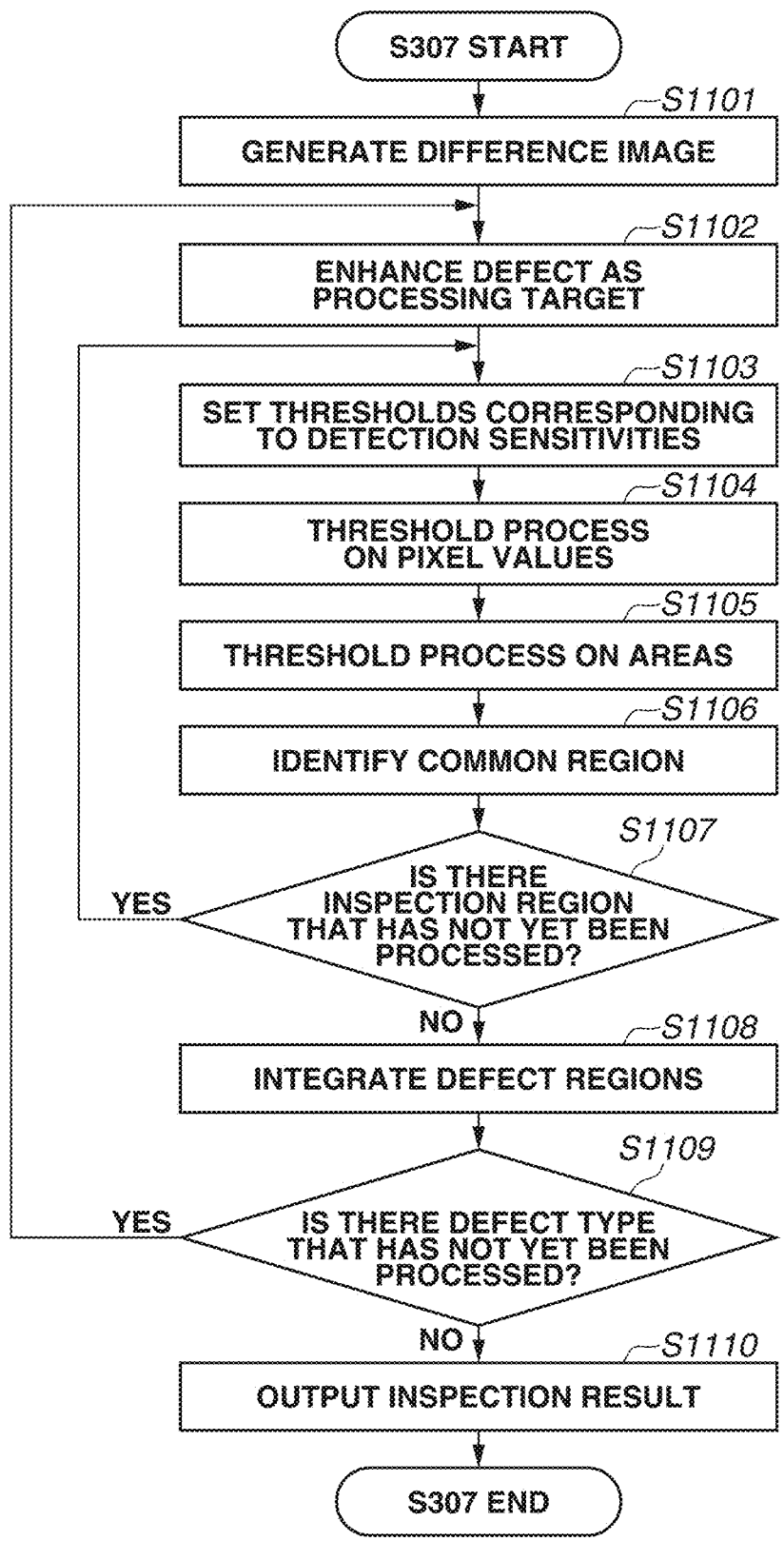
FIG. 11 is a flowchart illustrating an inspection process.
Figure 12:
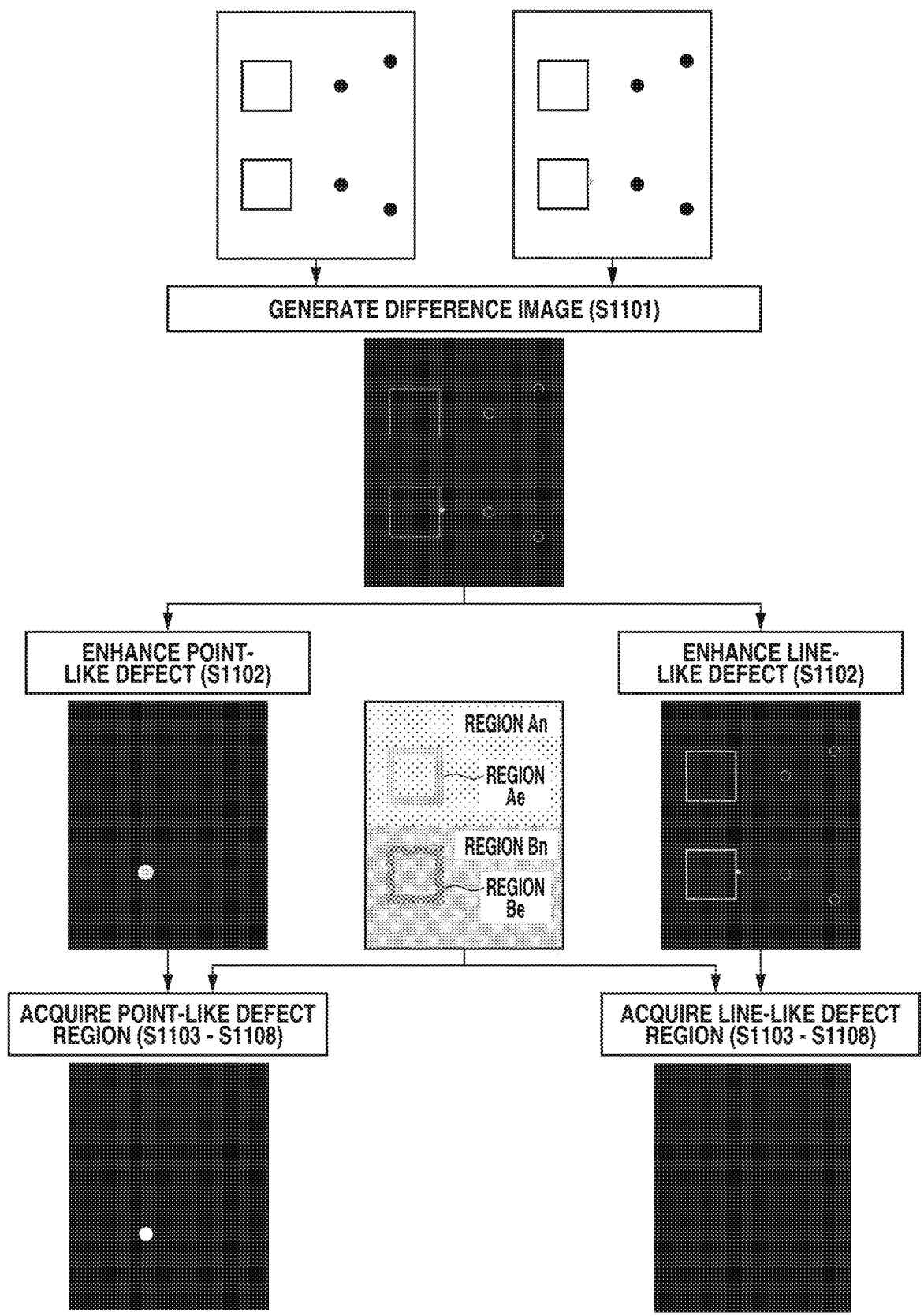
FIG. 12 is a diagram illustrating an overview of the inspection process.

FIG. 11 is a flowchart illustrating the inspection process. FIG. 12 is a diagram illustrating an overview of the inspection process. The details of the inspection process are described below. In step S1101, based on the reference image and the inspection target image, the inspection processing unit 207 calculates the absolute value of the difference in luminance value between corresponding pixels in the reference image and the inspection target image and generates a difference image having the absolute value of the difference in luminance value at each pixel. In step S1102, the inspection processing unit 207 enhances a defect in a processing target included in the difference image, thereby generating a defect-enhanced image. In a case where the defect as the processing target is a line-like defect, a line enhancement filter is applied to the difference image. As the line enhancement filter, a Sobel filter is used. In a case where the defect as the processing target is a point-like defect, a point enhancement filter is applied to the difference image. As the point enhancement filter, a known two-dimensional Laplacian-of-Gaussian (LoG) filter is used. Alternatively, as the point enhancement filter, a known two-dimensional filter such as a Difference-of-Gaussian (DoG) filter may be used.

In step S1103, the inspection processing unit 207 sets thresholds to be used in the inspection based on the detection sensitivities corresponding to an inspection region as a processing target and the defect as the processing target. In the present exemplary embodiment, the inspection processing unit 207 compares pixel values in the defect-enhanced image with a threshold $Th_1$, thereby detecting defect pixels included in a defect region. Further, to determine whether the defect region has a sufficient area, the inspection processing unit 207 compares the area of the defect region composed of the group of defect pixels linked together with a threshold $Th_2$. In step S1103, the inspection processing unit 207 sets the thresholds $Th_1$ and $Th_2$. Specifically, the inspection processing unit 207 sets each threshold so that the higher the detection sensitivity is, the lower the contrast between a defect and the background can be, or the smaller the size of a defect can be. The inspection processing unit 207 sets the threshold $Th_1$ so that the higher the detection sensitivity is, the smaller the value of the threshold $Th_1$ is. The inspection processing unit 207 sets the threshold $Th_2$ so that the higher the detection sensitivity is, the smaller the value of the threshold $Th_2$ is. For example, in the present exemplary embodiment, since the detection sensitivity for a line-like defect is higher in the region An than in the region Ae, the threshold $Th_1$ is set to be smaller in the region An than in the region Ae, and the threshold $Th_2$ is set to be smaller in the region An than in the region Ae.

In step S1104, the inspection processing unit 207 performs a threshold process on pixel values in the defect-enhanced image using the threshold $Th_1$. The inspection processing unit 207 detects, among pixels in the defect-enhanced image, a pixel having a pixel value greater than or equal to the threshold $Th_1$, as a defect pixel by the threshold process. In step S1105, the inspection processing unit 207 performs a threshold process on the areas of defect regions in the defect-enhanced image using the threshold $Th_2$. The inspection processing unit 207 removes, from the defect pixels detected in step S1104, pixels in a defect region where the number of linked pixels is smaller than the threshold $Th_2$ by the threshold process.

In step S1106, the inspection processing unit 207 identifies a region common to the inspection region as the processing target and the defect regions. By this, it is possible to detect only the defect regions in the inspection region as the processing target. In step S1107, the inspection processing unit 207 determines whether there is an inspection region that has not yet been processed. If there is an inspection region that has not yet been processed (YES in step S1107), the inspection region as the processing target is updated, and the processing returns to step S1103. If there is not an inspection region that has not yet been processed (NO in step S1107), the processing proceeds to step S1108.

In step S1108, the inspection processing unit 207 integrates the defect regions in each of the inspection regions. This can acquire a defect region corresponding to the defect as the processing target. In step S1109, the inspection processing unit 207 determines whether there is a defect type that has not yet been processed. If there is a defect type that has not yet been processed (YES in step S1109), the defect as the processing target is updated, and the processing returns to step S1102. If there is not a defect type that has not yet been processed (NO in step S1109), the processing proceeds to step S1110. In step S1110, the inspection processing unit 207 outputs the inspection result. If there is not a defect region with respect to all the defect types, the inspection result is pass. If there is a defect region with respect to any of the defect types, the inspection result is fail.

<Effects of First Exemplary Embodiment>

As described above, the image processing apparatus 100 according to the present exemplary embodiment sets a reference image as a targeted printing result. The image processing apparatus 100 sets detection sensitivities for a plurality of types of defects. The image processing apparatus 100 extracts a region corresponding to a local pattern from the reference image. The image processing apparatus 100 adjusts the detection sensitivities to lower the detection sensitivity for a defect similar to the local pattern in the region corresponding to the local pattern. The image processing apparatus 100 acquires image data representing an image as an inspection target. Based on the reference image and the adjusted detection sensitivities, the image processing apparatus 100 inspects the image as the inspection target. This can improve the accuracy of inspection of the vicinity of a region including a feature in an inspection target image.

<Variations>

The region setting unit 202 according to the present exemplary embodiment sets two regions, namely the inspection regions A and B, as the inspection regions. The method for setting the inspection regions, however, is not limited to this. Alternatively, for example, the entire reference image may be set as a single inspection region. Yet alternatively, three or more regions may be set as the inspection regions. Yet alternatively, a non-inspection region where a defect is not to be detected may be set. In a case where the non-inspection region is set, pixel values in the non-inspection region are set to 0 in the difference image generated in step S1101, whereby it is possible to avoid detecting a defect in the non-inspection region.

The detection sensitivity setting unit 203 according to the present exemplary embodiment sets the detection sensitivities at three levels. The method for setting the detection sensitivities, however, is not limited to this. Alternatively, for example, the detection sensitivities may be set at two levels, or may be set at four or more levels. Yet alternatively, the detection sensitivity for any of the defects may be fixed.

Figure 8C:
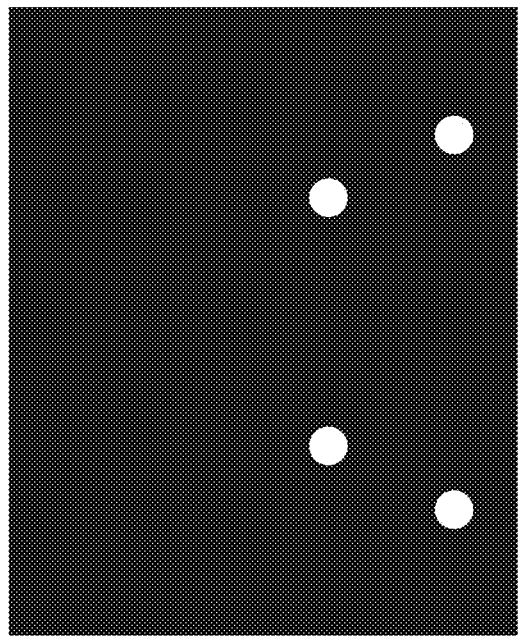

The local pattern extraction unit 204 according to the present exemplary embodiment extracts the region corresponding to the line-like pattern as the region corresponding to the local pattern, but may extract a region corresponding to a point-like pattern. In this case, in step S701, the local pattern extraction unit 204 applies a point enhancement filter to the reference image, thereby enhancing a point-like pattern included in the reference image. By the point enhancement filter, the more the pixel corresponds to the point-like pattern, the greater the pixel value of the pixel is. Hereinafter, an image obtained by applying the point enhancement filter to the reference image will be referred to as a "point-enhanced image". As the point enhancement filter, a two-dimensional LoG filter is used. In step S702, the local pattern extraction unit 204 extracts a region corresponding to the point-like pattern in the point-enhanced image. As the region corresponding to the point-like pattern, a dot region is extracted. FIG. 8C illustrates an example of the dot region. Specifically, the local pattern extraction unit 204 performs a threshold process on pixels in the point-enhanced image and extracts a pixel having a pixel value greater than a threshold, as a dot pixel included in the dot region. A known morphological process may be applied to the extracted dot region, thereby correcting the dot region.

Figure 8D:
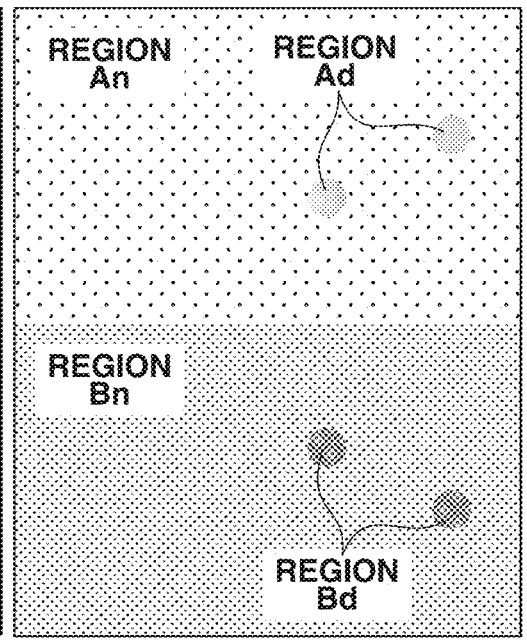

In step S901, the detection sensitivity adjustment unit 205 divides each of the inspection regions based on the dot region. FIG. 8D illustrates examples of the divided inspection regions. The detection sensitivity adjustment unit 205 sets a dot region in the inspection region A as a region Ad and sets a non-dot region in the inspection region A as a region An. The detection sensitivity adjustment unit 205 sets a dot region in the inspection region B as a region Bd and sets a non-dot region in the inspection region B as a region Bn. In step S902, the detection sensitivity adjustment unit 205 lowers the detection sensitivity for a point-like defect as a defect similar to the point-like pattern in the dot region. Specifically, in the region Ad, the detection sensitivity adjustment unit 205 sets the detection sensitivity for a point-like defect to be lower than the detection sensitivity set for the inspection region A and sets the detection sensitivity for a line-like defect to be the same as the detection sensitivity set for the inspection region A. In the region Bd, the detection sensitivity adjustment unit 205 sets the detection sensitivity for a point-like defect to be lower than the detection sensitivity set for the inspection region B and sets the detection sensitivity for a line-like defect to be the same as the detection sensitivity set for the inspection region B. A detection sensitivity for the region An is set to be the same as the detection sensitivity set for the inspection region A, and a detection sensitivity for the region Bn is set to be the same as the detection sensitivity set for the inspection region B. FIG. 10B illustrates examples of the adjusted detection sensitivities.

The types of defects according to the present exemplary embodiment are two types, namely a point-like defect and a line-like defect. Alternatively, for example, line-like defects different in direction, such as a vertical line-like defect and a horizontal line-like defect, may be detected as different defect types. In a case where the defect as the processing target is a vertical line-like defect, then in step S1102, the inspection processing unit 207 applies a vertical line enhancement filter for enhancing a line in a vertical direction to the difference image. In a case where the defect as the processing target is a horizontal line-like defect, then in step S1102, the inspection processing unit 207 applies a horizontal line enhancement filter for enhancing a line in a horizontal direction to the difference image.

In the inspection process according to the present exemplary embodiment, the threshold process on the pixel values and the threshold process on the areas are performed. Alternatively, defect regions may be detected by performing only the threshold process on the pixel values. In this case, as the thresholds corresponding to the detection sensitivities, only a threshold for the pixel values needs to be set.

In the present exemplary embodiment, the user is notified of whether the inspection target image passes or fails the inspection. Alternatively, a defect region in the inspection target image having failed the inspection may be displayed on the UI panel 108.

Second Exemplary Embodiment

In the first exemplary embodiment, a region corresponding to a line-like pattern is extracted as a region corresponding to a local pattern from a reference image, and a detection sensitivity for a line-like defect is lowered. In a second exemplary embodiment, a region corresponding to each of a plurality of types of local patterns is extracted from a reference image, and a detection sensitivity for a defect similar to each of the local patterns is lowered. The configuration of a printing system and the functional configuration of an image processing apparatus 100 according to the present exemplary embodiment are equivalent to those according to the first exemplary embodiment, and therefore are not described. The processes of steps S304 and S305, which are different between the present exemplary embodiment and the first exemplary embodiment, are mainly described below. Components similar to those of the first exemplary embodiment are designated by the same signs in the description.

<Process of Extracting Region Corresponding to Each of Local Patterns>

Figure 13:
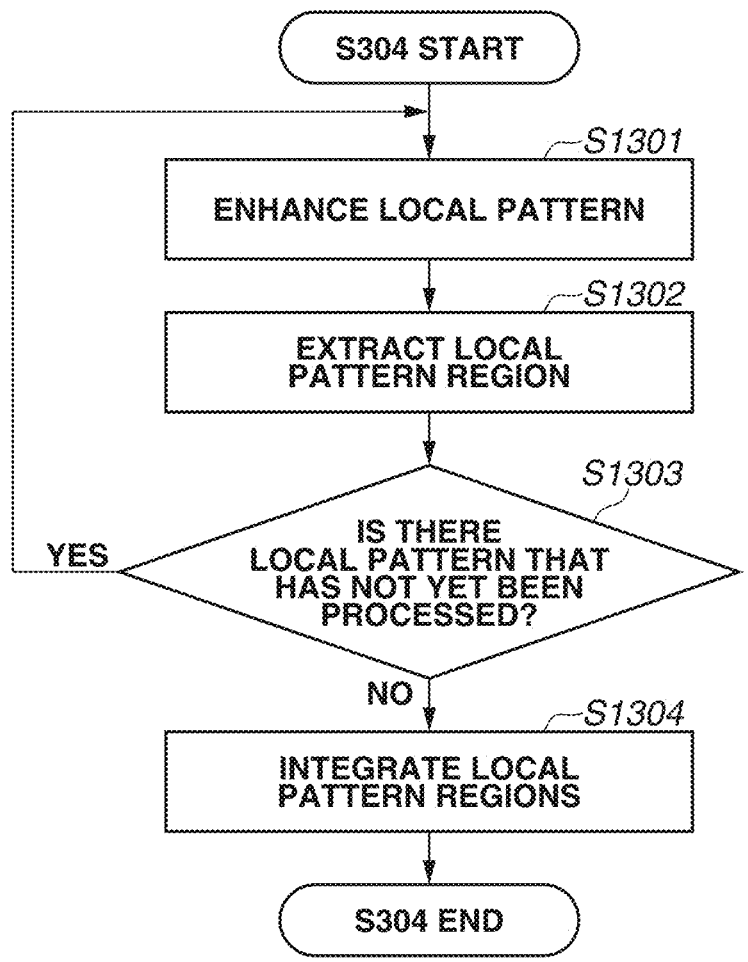
FIG. 13 is a flowchart illustrating a process of extracting local pattern regions.

In step S304, the local pattern extraction unit 204 extracts a region corresponding to each of a plurality of types of local patterns in the reference image. In the present exemplary embodiment, a region corresponding to a line-like pattern and a region corresponding to a point-like pattern are extracted as the plurality of types of local patterns. FIG. 13 is a flowchart illustrating the process of extracting the region corresponding to each of the plurality of types of local patterns. The details of the process of extracting the region corresponding to each of the plurality of types of local patterns are described below.

In step S1301, the local pattern extraction unit 204 enhances a local pattern as a processing target included in the reference image. In a case where the local pattern as the processing target is the line-like pattern, the local pattern extraction unit 204 applies a line enhancement filter to the reference image. In a case where the local pattern as the processing target is the point-like pattern, the local pattern extraction unit 204 applies a point enhancement filter to the reference image. In step S1302, the local pattern extraction unit 204 extracts the region corresponding to the local pattern in an image where the local pattern is enhanced. In a case where the local pattern as the processing target is the line-like pattern, the local pattern extraction unit 204 performs a threshold process on pixels in a line-enhanced image and extracts a pixel having a pixel value greater than a threshold, as an edge pixel. In a case where the local pattern as the processing target is the point-like pattern, the local pattern extraction unit 204 performs a threshold process on pixels in a point-enhanced image and extracts a pixel having a pixel value greater than a threshold, as a dot pixel.

Figure 14A:
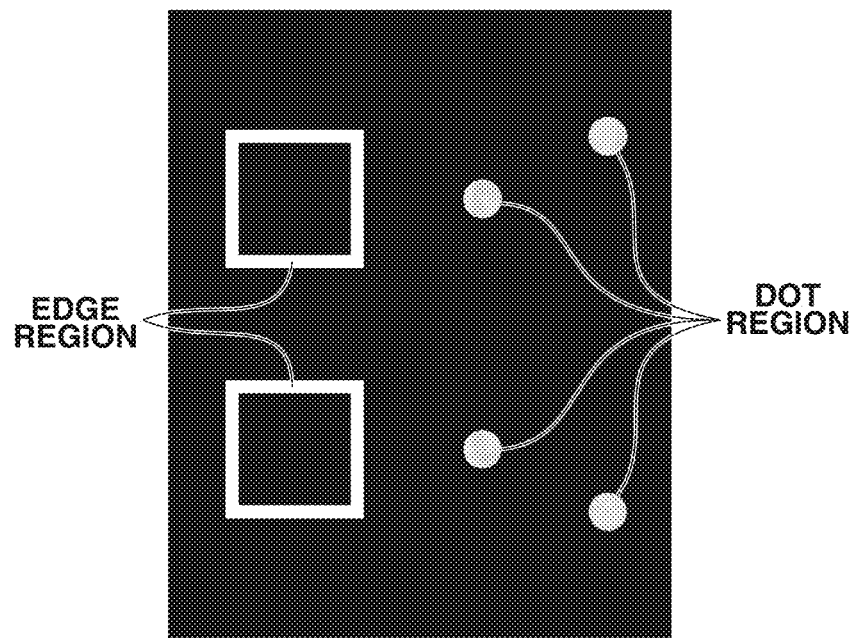
FIGS. 14A and 14B are diagrams illustrating examples of local pattern regions.

In step S1303, the local pattern extraction unit 204 determines whether there is a local pattern that has not yet been processed. If there is a local pattern that has not yet been processed (YES in step S1303), the local pattern as the processing target is updated, and the processing returns to step S1301. If there is not a local pattern that has not yet been processed (NO in step S1303), the processing proceeds to step S1304. In step S1304, the local pattern extraction unit 204 integrates the regions corresponding to each of the plurality of types of local patterns. Specifically, the local pattern extraction unit 204 replaces a pixel included in both the edge region and the dot region with a pixel belonging to either one of the regions. The local pattern extraction unit 204 according to the present exemplary embodiment replaces a pixel included in both the edge region and the dot region with an edge pixel included in the edge region. FIG. 14A illustrates examples of the regions corresponding to the local patterns extracted in the process of step S1304.

<Process of Adjusting Detection Sensitivities>

Figure 14B:
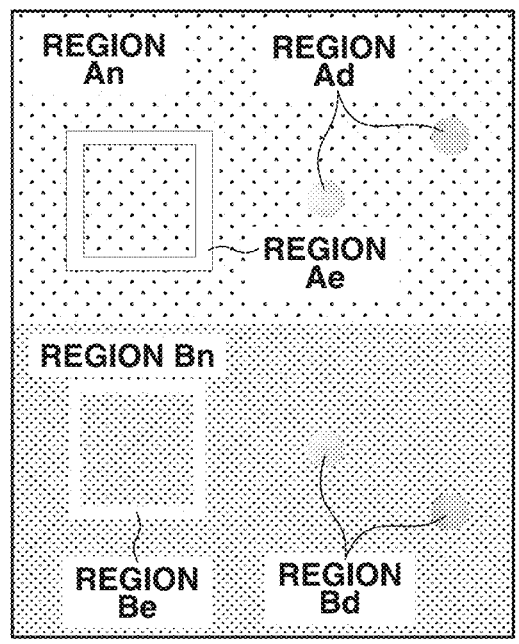
Figure 15:
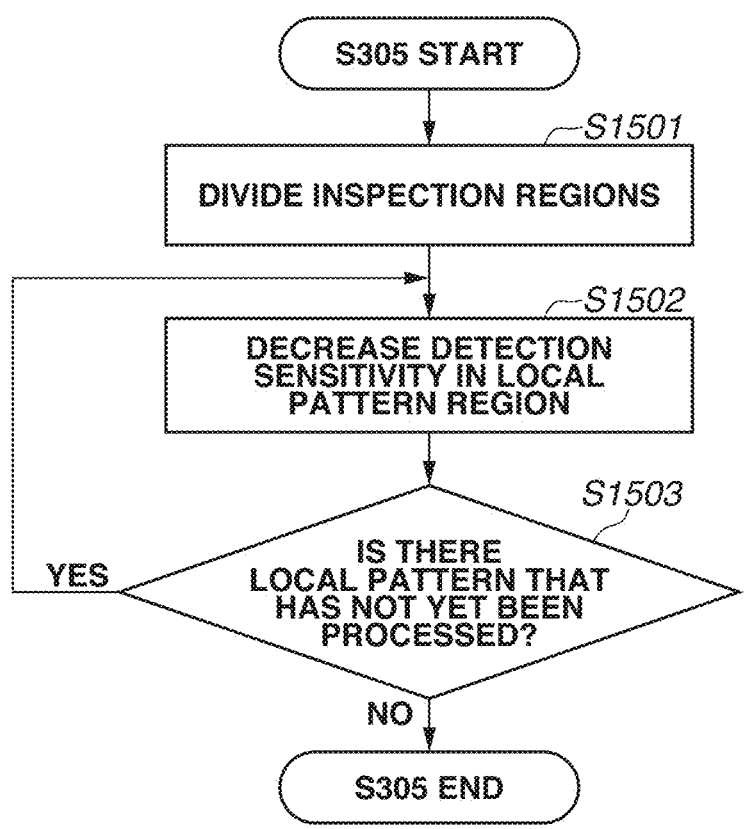
FIG. 15 is a flowchart illustrating a process of adjusting detection sensitivities.

In step S305, the detection sensitivity adjustment unit 205 lowers the detection sensitivity for a line-like defect in the edge region and lowers the detection sensitivity for a point-like defect in the dot region. FIG. 15 is a flowchart illustrating the process of adjusting the detection sensitivities. The details of the process of adjusting the detection sensitivities are described below. In step S1501, the detection sensitivity adjustment unit 205 divides each of the inspection regions based on a region corresponding to a local pattern as a processing target. FIG. 14B illustrates examples of the divided inspection regions. In the inspection region A, the detection sensitivity adjustment unit 205 sets an edge region as a region Ae, sets a dot region as a region Ad, and sets another region as a region An. In the inspection region B, the detection sensitivity adjustment unit 205 sets an edge region as a region Be, sets a dot region as a region Bd, and sets another region as a region Bn.

In step S1502, in the region corresponding to the local pattern as the processing target, the detection sensitivity adjustment unit 205 lowers the detection sensitivity for a defect similar to the local pattern as the processing target. In a case where the local pattern as the processing target is the line-like pattern, the detection sensitivity adjustment unit 205 lowers the detection sensitivity for a line-like defect in the edge region. Specifically, in the region Ae, the detection sensitivity adjustment unit 205 sets the detection sensitivity for a line-like defect to be lower than the detection sensitivity set for the inspection region A. In the region Be, the detection sensitivity adjustment unit 205 sets the detection sensitivity for a line-like defect to be lower than the detection sensitivity set for the inspection region B. In a case where the local pattern as the processing target is the point-like pattern, the detection sensitivity adjustment unit 205 lowers the detection sensitivity for a point-like defect in the dot region. Specifically, in the region Ad, the detection sensitivity adjustment unit 205 sets the detection sensitivity for a point-like defect to be lower than the detection sensitivity set for the inspection region A. In the region Bd, the detection sensitivity adjustment unit 205 sets the detection sensitivity for a point-like defect to be lower than the detection sensitivity set for the inspection region B. FIG. 16A illustrates examples of the adjusted detection sensitivities.

In step S1503, the detection sensitivity adjustment unit 205 determines whether there is a local pattern that has not yet been processed. If there is a local pattern that has not yet been processed (YES in step S1503), the local pattern as the processing target is updated, and the processing returns to step S1502. If there is not a local pattern that has not yet been processed (NO in step S1503), the process of step S305 ends.

<Effects of Second Exemplary Embodiment>

As described above, the image processing apparatus 100 according to the present exemplary embodiment extracts a region corresponding to each of a plurality of types of local patterns and adjusts detection sensitivities according to the extracted region. This can improve the accuracy of inspection of the vicinity of a region including a feature in an inspection target image.

<Variations>

In the present exemplary embodiment, as the regions corresponding to the local patterns, the edge region and the dot region are extracted. The local patterns, however, are not limited to these regions. For example, local patterns of the same type but different in contrast with the background may be separately extracted. In this case, detection sensitivities are adjusted so that the higher the contrast between the region corresponding to the local pattern and the background is, the lower the detection sensitivity is. As an example, a case is described where a high-contrast edge region and a low-contrast edge region are separately extracted. First, a threshold $Th_{EH}$ corresponding to the high-contrast edge region and a threshold $Th_{EL}$ corresponding to the low-contrast edge region are set. The value of the threshold $Th_{EH}$ is greater than that of the threshold $Th_{EL}$.

In step S1302, in a case where the local pattern as the processing target is a high-contrast edge, the local pattern extraction unit 204 performs a threshold process on pixels in a line-enhanced image and extracts a pixel having a pixel value greater than the threshold $Th_{EH}$, as a pixel in the high-contrast edge region. In a case where the local pattern as the processing target is a low-contrast edge, the local pattern extraction unit 204 performs a threshold process on pixels in a line-enhanced image and extracts a pixel having a pixel value greater than the threshold $Th_{EL}$, as a pixel in the low-contrast edge region. In step S1304, the local pattern extraction unit 204 replaces, among the pixels in the low-contrast edge region, a pixel redundant with a pixel in the high-contrast edge region with a pixel in the high-contrast edge region.

In step S1501, in the inspection region A, the detection sensitivity adjustment unit 205 sets a high-contrast edge region as a region $Ae_H$, sets a low-contrast edge region as a region $Ae_L$, and sets another region as a region An. In the inspection region B, the detection sensitivity adjustment unit 205 sets a high-contrast edge region as a region $Be_H$, sets a low-contrast edge region as a region $Be_L$, and sets another region as a region Bn. In step S1502, the detection sensitivity adjustment unit 205 lowers the detection sensitivity for a line-like defect in the edge region. Specifically, in a case where the local pattern as the processing target is a high-contrast edge, then in the region $Ae_H$, the detection sensitivity adjustment unit 205 sets the detection sensitivity for a line-like defect to be lower than the detection sensitivity set for the inspection region A. In the region $Be_H$, the detection sensitivity adjustment unit 205 sets the detection sensitivity for a line-like defect to be lower than the detection sensitivity set for the inspection region B. In a case where the local pattern as the processing target is a low-contrast edge, then in the region $Ae_L$, the detection sensitivity adjustment unit 205 sets the detection sensitivity for a line-like defect to be lower than the detection sensitivity set for the inspection region A. In the region $Be_L$, the detection sensitivity adjustment unit 205 sets the detection sensitivity for a line-like defect to be lower than the detection sensitivity set for the inspection region B. FIG. 16B illustrates examples of the adjusted detection sensitivities.

According to the present disclosure, it is possible to improve the accuracy of inspection of the vicinity of a region including a feature in an inspection target image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   one or more memories configured to store instructions; and
     one or more processors configured to execute the stored instructions to function as:
     a first acquisition unit configured to acquire an inspection target image;
     a second acquisition unit configured to acquire a first inspection sensitivity for a defect that a user specifies; and
   an inspection unit configured to inspect, with a second inspection sensitivity lower than the first inspection sensitivity, a first region which corresponds to a specific pattern similar to the defect in the inspection target image, and inspect, with the first inspection sensitivity, a second region which does not corresponds to the specific pattern in the inspection target image.

2. The apparatus according to claim 1, wherein the inspection unit is configured to inspect the inspection target mage using a reference image which is an inspection reference.

3. The image according to claim 1, wherein the one or more processors are further configured to cause the image processing apparatus to function as an extraction unit configured to extract a region which corresponds to the specific pattern in a reference image which is an inspection reference, and
   the first region is set based on the extracted region.

4. The apparatus according to claim 3, wherein the extraction unit is configured to extract, using a filter for enhancing the specific pattern, the region which corresponds to the specific pattern in the reference image.

5. The apparatus according to claim 1, wherein the inspection unit is configured to inspect the inspection target image using a threshold and a pixel value of a difference image which indicates difference between the inspection target image and a reference image which is an inspection reference.

6. The apparatus according to claim 5, wherein the inspection unit sets the threshold so that the higher the inspection sensitivity is, the smaller the value of the threshold is.

7. The apparatus according to claim 1, wherein the specific pattern is a line-like pattern and a defect similar to the line-like pattern is a line-like defect.

8. The apparatus according to claim 1, wherein the specific pattern is a point-like pattern and a defect similar to the point-like pattern is a point-like defect.

9. The apparatus according to claim 1, wherein the one or more processors are further configured to cause the image processing apparatus to function as:
   a print unit configured to print based on a document; and
   a reading unit configured to read a print product obtained by the print,
   wherein the inspection target image is obtained by reading the print product.

10. The apparatus according to claim 9, wherein a print product having passed the inspection by the inspection unit is output to a first tray, and a print product having failed the inspection by the inspection unit is output to a second tray different from the first tray.

11. The apparatus according to claim 1, wherein the inspection unit inspects the first region with the second inspection sensitivity that a user does not specify.

12. The apparatus according to claim 1, wherein the one or more processors are further configured to cause the image processing apparatus to function as a display control unit configured to display a user interface used for specify an inspection sensitivity for each of a plurality types of defects.

13. The apparatus according to claim 1, wherein the one or more processors are further configured to cause the image processing apparatus to function as a display control unit configured to display a user interface used for specify an inspection sensitivity for a line-like defect and an inspection sensitivity for a point-like defect.

14. The apparatus according to claim 1, wherein the second acquisition unit is configured to acquire the first inspection sensitivity for a line-like defect that a user specifies and a third inspection sensitivity for a point-like defect that the user specifies, and the inspection unit is configured to inspect, with the second inspection sensitivity and the third inspection sensitivity, the first region which corresponds to the line-like pattern in the inspection target image, and inspect the second region with the first inspection sensitivity and the third inspection sensitivity.

15. The apparatus according to claim 1, wherein the second acquisition unit is configured to acquire the first inspection sensitivity for a line-like defect that a user specifies and a third inspection sensitivity for a point-like defect that the user specifies, and
   the inspection unit is configured to inspect, with the second inspection sensitivity, the first region which corresponds to the line-like pattern in the inspection target image, inspect the second region with the first inspection sensitivity, inspect, with a fourth inspection sensitivity lower than the third inspection sensitivity, a third region which corresponds to the point-like pattern in the inspection target image, and inspect, with the third inspection sensitivity, a fourth region which does not correspond to the point-like pattern in the inspection target image.

16. An image processing method comprising:

acquiring an inspection target image;

acquiring a first inspection sensitivity for a defect that a user specifies; and inspecting, with a second inspection sensitivity lower than the first inspection sensitivity, a first region which corresponds to a specific pattern similar to the defect in the inspection target image, and inspect, with the first inspection sensitivity, a second region which does not corresponds to the specific pattern in the inspection target image.

17. A non-transitory computer-readable storage medium storing instructions that, when executed by a computer, cause the computer to perform a method comprising:

acquiring an inspection target image;

acquiring a first inspection sensitivity for a defect that a user specifies; and inspecting, with a second inspection sensitivity lower than the first inspection sensitivity, a first region which corresponds to a specific pattern similar to the defect in the inspection target image, and inspect, with the first inspection sensitivity, a second region which does not corresponds to the specific pattern in the inspection target image.

* * * * *